Patented Jan. 23, 1951

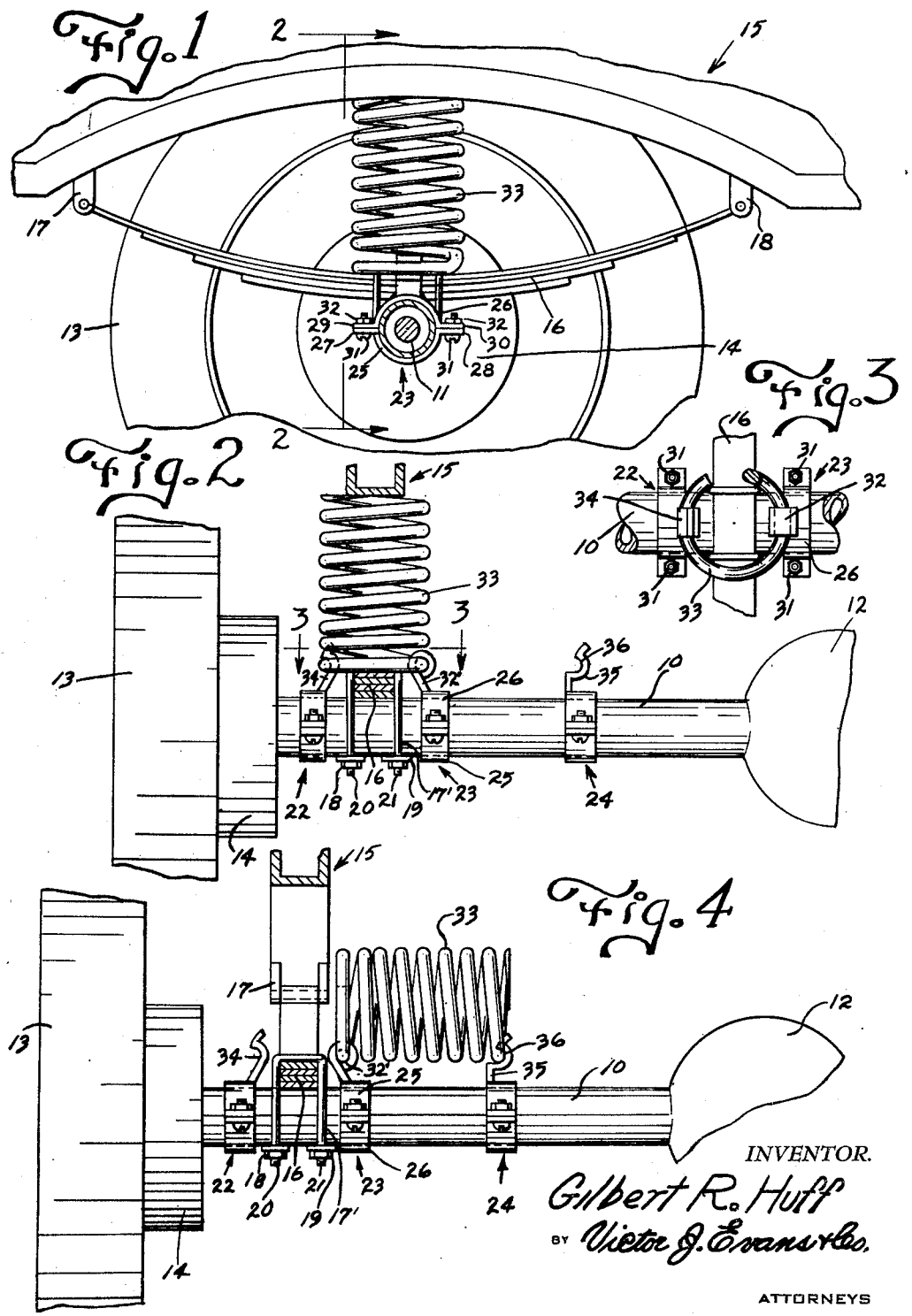

2,539,251

UNITED STATES PATENT OFFICE 2,539,251

FOLDING OVERLOAD SPRING

Gilbert R. Huff, Wichita, Kans.

Application May 25, 1948, Serial No. 29,098

1 Claim. (Cl. 267—28)

This invention relates to a vehicle spring and more particularly to a vehicle spring that can be easily moved into operating position during periods of overload, and moved into an out-of-the-way position during normal driving.

The object of this invention is to provide an overload spring for a vehicle that can be quickly and safely brought into use to supplement the ordinary vehicle elliptic spring when a heavy load is being transported in the vehicle.

A further object of the invention is to provide an overload spring that can be quickly moved out of operating position when normal loads are being transported in the vehicle.

Other objects and advantages of the invention will be apparent during the course of the following description.

In the accompanying drawings, forming a part of this application, and in which like numerals are employed to designate like parts throughout the same:

Figure 1 is a side elevational view of the overload spring in operating position, according to the present invention, Figure 2 is a view taken on the line 2—2 of Figure 1, Figure 3 is a view taken on the line 3—3 of Figure 2, Figure 4 is an end elevational view, showing the overload spring in its folded, out-of-the-way position, when not in use.

In the drawings, wherein for the purpose of illustration is shown a preferred embodiment of the invention, the numeral 10 designates the rear axle housing encasing the rear axle 11 driven from the differential 12. Rotatably mounted on the rear axle housing 10 is the wheel 13 and brake drum 14 therefor.

A portion of a vehicle body is indicated generally by the reference numeral 15, Figures 1 and 4, and an ordinary elliptic spring 16 has its ends operatively connected to the lugs 17 and 18 which are secured to the vehicle body 15. The elliptic spring 16 is mounted on the rear axle housing 10 and secured thereon by means of the U-bolts 17' arranged in embracing relation with respect to the elliptic spring 16 which is locked in position on the axle housing 10 by means of the nuts 18 and 19 threadedly engaging the respective ends 20 and 21 of the U-bolts 17', Figures 2 and 4.

Arranged in spaced, parallel, relation along the rear axle housing 10 are the clamps 22, 23 and 24. Each of the clamps are of similar construction and embody the pair of arcuately shaped brackets 25 and 26 arranged in embracing relation on the rear axle housing 10, Figures 1, 2 and 3. The bracket 25 is provided with the pair of apertured flanges 27 and 28 and the complemental bracket 26 is provided with the pair of apertured flanges 29 and 30. Extending through the registering apertured flanges is the bolt 31 and threadedly engaging the ends of each of the bolts 31 is the castle nut 32.

Projecting upwardly from the clamp 23 and secured thereto is an eye hook 32' which forms a pivotal connection with the coil or overload spring 33 which acts to supplement the elliptic spring 16 whenever extremely heavy loads are being transported in the vehicle. The clamp 22 has projecting therefrom the clasp 34 for engaging a portion of the overload spring 33 to thereby maintain the latter in its upright, operative position, Figures 2 and 3.

The clamp 24 has a vertically disposed lug 35 secured thereto and the lug 35 is provided with the hook 36 for engaging a portion of the overload spring 33 to thereby releasably lock the latter in position on the rear axle housing 10 when not in use, Figure 4, as during periods of normal loading of the vehicle.

In use, when the vehicle is to be used for transporting heavy loads, the body 15 of the vehicle is jacked up and the overload spring 33 is disengaged from the clasp 36 of the clamp 24, and the spring 33 is moved from the position shown in Figure 4 to the position of Figure 1, so that the overload spring 33 will supplement the elliptic spring 16. When the vehicle is transporting normal loads, the overload spring 33 is not used and during such times, the overload spring 33 is pivoted about the hook eye 32' of the clamp 23 to its horizontal position where it is engaged by the hook 36 of the clamp 24.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a vehicle including a rear axle housing, an elliptic spring mounted on said housing, and a vehicle body supported on said elliptic spring, the improvement consisting of providing resilient means on said rear axle housing for supporting said vehicle body when said vehicle is overloaded, said resilient means comprising a coil spring pivotally mounted on said rear axle housing for movement into and out of engagement with said vehicle body, and means for releasably securing said coil spring in a horizontal position on said rear axle housing when not in use, said last-named means comprising a clamp mounted on said rear axle housing and a hook projecting from said clamp for engaging said coil spring.

GILBERT R. HUFF.

REFERENCES CITED

The following references are of record in the file of this patent:

UNITED STATES PATENTS

| Number | Name | Date |
|---|---|---|
| 2,209,632 | Martin | July 30, 1940 |